April 8, 1924.
E. L. NEWELL
CALCULATING AND PLOTTING DEVICE
Filed Dec. 23, 1922
1,489,782
2 Sheets-Sheet 1
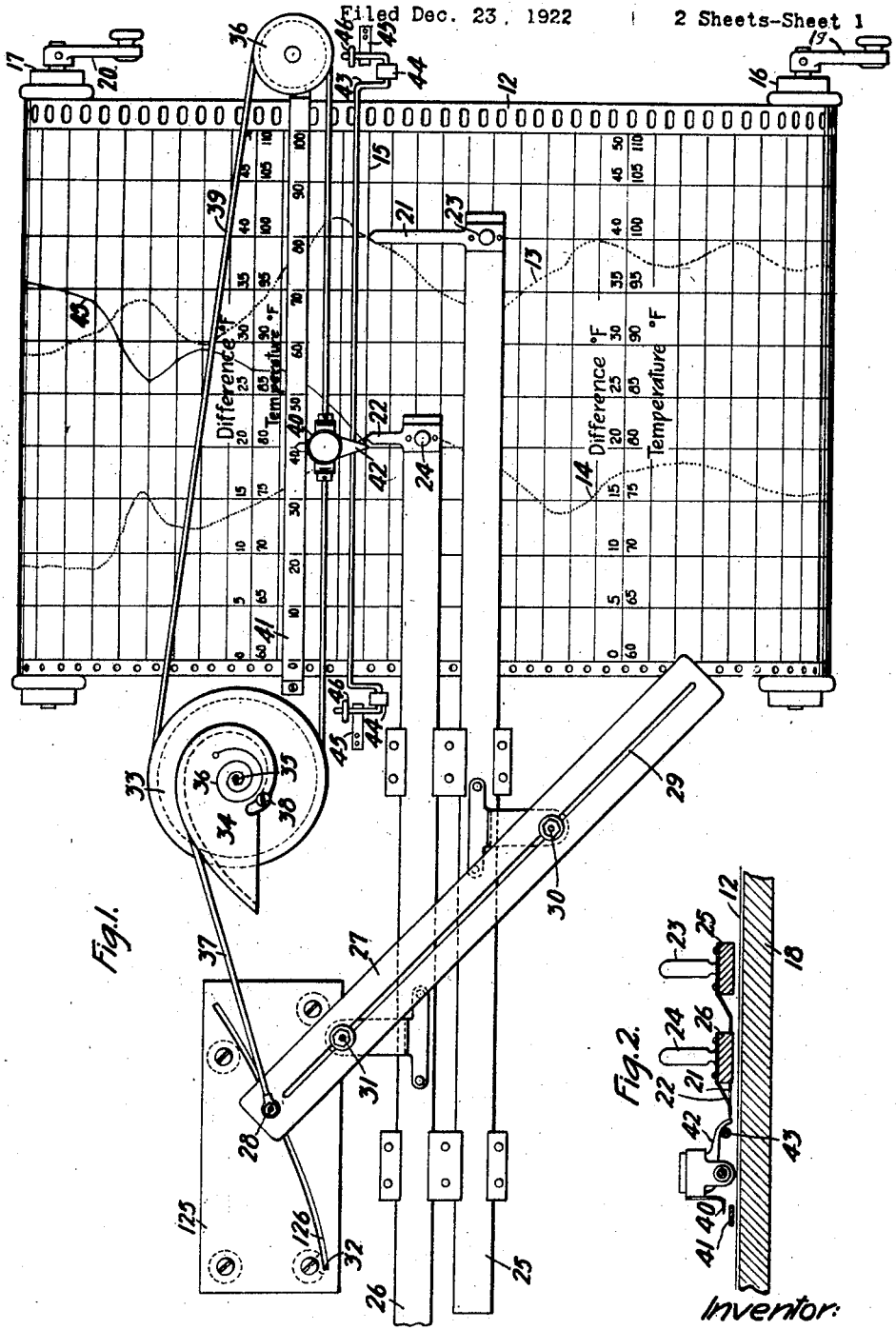

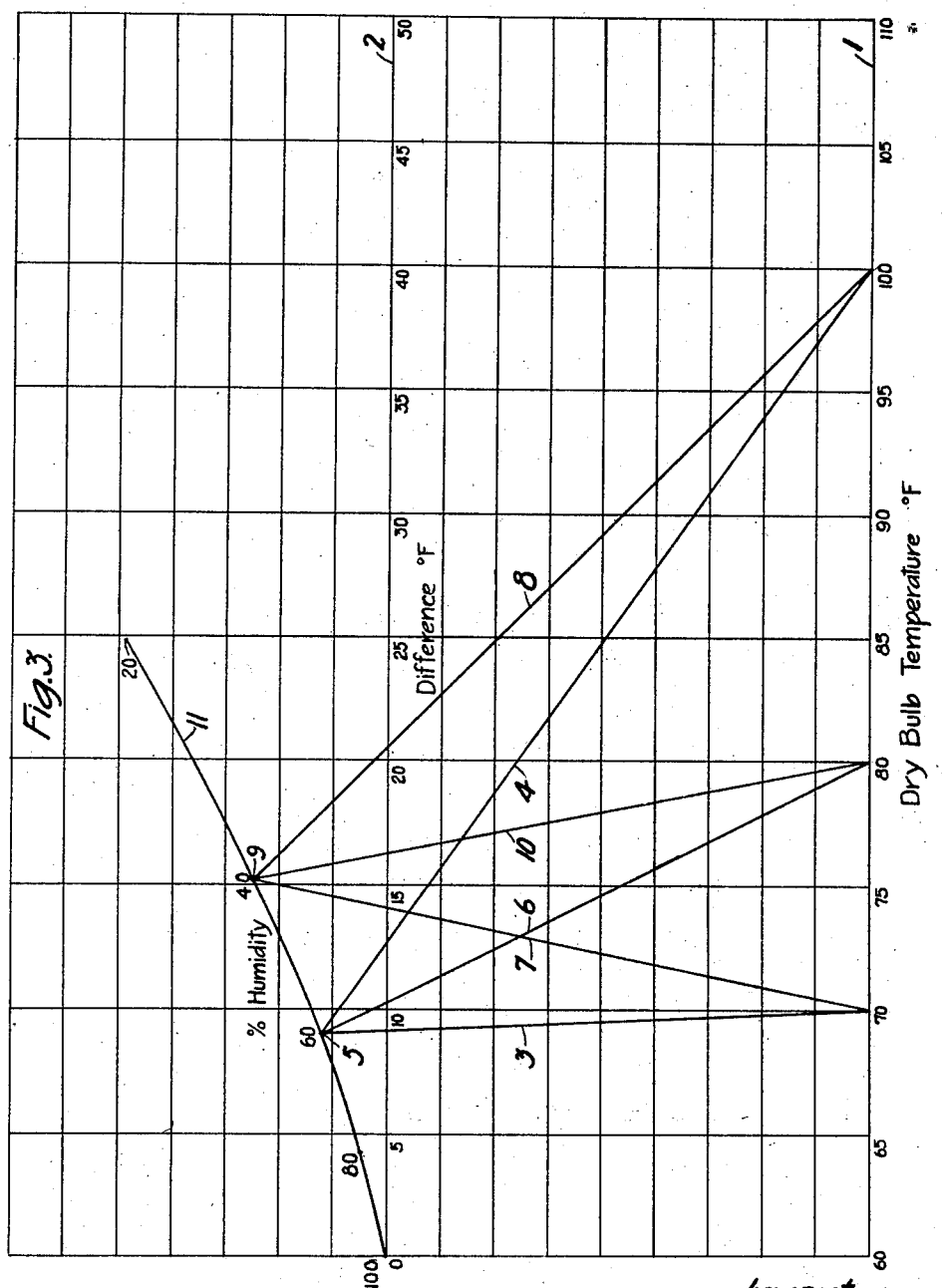

Patented Apr. 8, 1924.

1,489,782

UNITED STATES PATENT OFFICE.

EARL L. NEWELL, OF MONTCLAIR, NEW JERSEY, ASSIGNOR TO WESTERN ELECTRIC COMPANY, INCORPORATED, OF NEW YORK, N. Y., A CORPORATION OF NEW YORK.

CALCULATING AND PLOTTING DEVICE.

Application filed December 23, 1922. Serial No. 608,621.

*To all whom it may concern:*

Be it known that I, EARL L. NEWELL, a citizen of the United States, residing at Montclair, in the county of Essex, State of New Jersey, have invented certain new and useful Improvements in Calculating and Plotting Devices, of which the following is a full, clear, concise, and exact description.

This invention relates to calculating and plotting devices and particularly to a mechanism for calculating and plotting values which are a function of other values that have previously been plotted to scale. It is particularly applicable to a device for calculating and plotting values of relative humidity from corresponding values of dry bulb temperature and difference between dry bulb and wet bulb temperature, that have previously been plotted against time by recording thermometers. However, it is to be understood that the invention is not limited to this application.

The object of the invention is the provision of apparatus for calculating, and for plotting, values which are the function of known values.

In accordance with the general features of this invention, a strip of paper containing a graphical record of dry bulb temperature and difference between dry bulb and wet bulb temperatures both plotted, as ordinates against time as abscissas, is passed in juxtaposition to the calculating and plotting device so that values of relative humidity can be calculated and plotted at desired points. Two indices are provided adjacent a flat surface and the record is passed between the indices and the surface so that any desired ordinate can be aligned with the indices. A desired ordinate having been aligned the two indices are placed in coincidence with the temperature and temperature difference curves thereby actuating mechanism which moves a pointer so that it takes up the correct position on a scale to indicate the corresponding value of relative humidity. Associated with the pointer, which indicates the value of relative humidity, is a recording pen which moves above the surface of the record and can be depressed so as to plot a point indicating to scale the relative humidity corresponding to the value of dry bulb temperature and difference between dry bulb and wet bulb temperatures for that ordinate of the record.

Referring to the drawings:

Fig. 1 shows a plan view of the calculating and plotting mechanism in conjunction with a graphical record, showing dry bulb temperature and difference between dry bulb and wet bulb temperatures;

Fig. 2 is a fragmentary cross-sectional view showing the relative position of the record strip, the indices which cooperate with the temperature curves, and the pen for plotting the value of relative humidity;

Fig. 3 is a line diagram which shows the basis upon which the mechanism of Fig. 1 is constructed.

Referring to Fig. 3, values of dry bulb temperature are laid off to scale on line 1 and values of difference between dry bulb and wet bulb temperatures are laid off to scale on line 2.

Suppose that a straight line 3, is drawn through some value of dry bulb temperature on line 1, such as 70°, and also through some value of difference between dry bulb and wet bulb temperatures on line 2, such as 9°. The intercepts, 70° and 9°, on lines 1 and 2 establish a definite value of relative humidity, such as 60%. Suppose that line 4 is drawn from 100° on line 1 through the point (12¾°) on line 2 which will establish a relative humidity of 60% for a dry bulb temperature of 100°. Line 4 will intersect line 3 at some point, such as 5. It is found that if a line 6 is drawn from any point on line 1 through a point on line 2, such that the two intercepts establish a humidity of 60%, this line will likewise pass through point 5.

Suppose the line 7 is drawn from 70° on line 1 through a point such as 14° on line 2. The intercepts 70 and 14 will establish a relative humidity, such as 40%. If a line 8 is drawn from 100° on line 1 through the point (20½°) on line 2 that will establish a relative humidity of 40%, line 8 will intersect line 7 at some point such as 9. It is found as before, that if any other line, such as 10 is drawn through two points that will establish a relative humidity of 40%, this line will pass through point 9.

It is apparent that a series of points such as 5 and 9 corresponding to various values of relative humidity may be plotted in the same manner as points 5 and 9 were plotted. If then a curve such as 11 is drawn through the points so plotted a scale of per cent relative humidity may be laid off on line 11. Curve 11 can be used to calculate values of relative humidity by laying a straight edge so that is passes through the values of dry bulb temperature and difference in temperature for which it is desired to calculate the humidity. The intercept of the straight edge on the scale of curve 11 gives directly the value of relative humidity. It is found that a curve such as 11, is quite accurate for relative humidity between 100% and 30% being less accurate for values of humidity below 30%.

Referring to Fig. 1, 12 designates a time chart having curves 13 and 14 indicating respectively dry bulb temperature and difference between dry bulb and wet bulb temperatures, which curves have previously been plotted by a recorder. Rollers 16 and 17, having cranks 19 and 20, respectively, are arranged so that chart 12 can be passed over surface 18 (Fig. 2) thus bringing desired ordinates into alignment with indices 21 and 22. Suppose ordinate 15 has been aligned with the indices. By means of knobs 23 and 24, sliding members 25 and 26 are moved to bring indices 21 and 22 into coincidence with curves 13 and 14 respectively. Pin 30 attached to member 25 is now in a position corresponding to 100° on line 1 of Fig. 3; and pin 31 attached to member 26 is in a position corresponding to 20½° on line 2 of Fig. 3. Member 125 has a slot 126 which is cut in accordance with curve 11 of Fig. 3, end 32 corresponding to 100% humidity. Pin 28 engages slot 126 and since this pin is on the line of slot 29 in member 30 which cooperates with pins 30 and 31, it follows that the distance along slot 126 of pin 28 from end 32 measures the relative humidity corresponding to a temperature of 100° and a difference of 20½° which is approximately 40%. In other words the present position of pin 28 corresponds to point 9 of Fig. 3.

It is seen that by placing indices 21 and 22 to coincide with values of temperature and temperature difference plotted on chart 12, pin 28 takes up a position which is a measure of the relative humidity corresponding to the values of temperature and temperature difference for which indices 21 and 22 are positioned. However, since the scale laid off on curve 11 of Fig. 3 is non-linear, it follows that the relative himidity is not a linear function of the distance along slot 126 of pin 28 from end 32.

A grooved pulley 33 is rigidly associated with a grooved cam 34 and mounted upon a shaft 35 which is rigidly associated with and projects from a supporting base through pulley 33 and cam 34. A helical spring 36 having one end secured to shaft 35 and the other end to cam 34 tends to move the pulley and cam in a clock-wise direction and thus maintains taut a cord 37 which has one end secured to point 28 and the other end secured at 38 to cam 34. Cam 34 is made of such shape that when pin 28 moves along the slot 126 from end 32 its angular position measured from the starting point is directly proportional to the value of relative humidity represented by the position of pin 28. The cord 39 which passes around pulley 35 and a second pulley 36 carries a pointer 40 which cooperates with a regular scale 41 to indicate directly the value of relative humidity corresponding to the temperature and temperature difference at which indices 21—22 respectively, are positioned. Associated with pointer 40 is a recording pen 42 which is held supported above paper 12 by means of a wire 43 which is pivoted at 44 and held above the paper by means of flat springs 45. Staple-like members 46 limit the height to which the wire may be raised above the paper by means of spring 45.

It is apparent that when indices 21 and 22 are positioned to points of temperature and temperature difference, pen 42 will take up a position corresponding to the value of relative humidity established by the temperature and temperature difference for which pointers 21 and 22 are positioned. By depressing wire 43, pen 42 will be allowed to fall under the action of gravity so as to make contact with paper 12 and thus plot a point which represents to scale, the relative humidity at the time represented by ordinate 15.

The exact shape of cam 34 can best be obtained by trial for any given device constructed in accordance with this invention. However, for the form of the invention illustrated the shape of the cam is given approximately by:

$$r = R\frac{A}{B}$$

in which:

$r$ is the radius of cam 34 at the point where cord 37 is tangent to the cam.

R is the radius of pulley 33.

A is the distance pin 28 travels for some small increment of angular movement of members 33 and 34, e. g. 5°.

B is the distance which pointer 40 travels for the same angular movement of members 33 and 34.

A graphical record of dry bulb temperature and difference in temperature between the dry bulb and the wet bulb having been obtained over a given time, it is seen that by means of this invention the corresponding values of the relative humidity at any given time may be readily calculated. If desired, the value of relative humidity may be plotted for frequent intervals, thus obtaining a curve 45 which shows to scale the variation in relative humidity over a period of time.

The invention claimed is:

1. In a computing device, a pair of slidable members arranged to be positioned in accordance with two known values, a pair of pivots which are positioned in accordance with the position of said slidable members, a pin movable along a characteristic path, a slotted member rotatably secured to said pin and in sliding engagement with said pivots, and means cooperating with said pin to indicate a value which is a function of the two known values.

2. In a computing device, a pair of slidable members arranged to be positioned in accordance with two known values, a pair of pivots rigidly associated with said slidable members, a pin movable along a characteristic path, a slotted member rotatably secured to said pin and in sliding engagement with said pivots, and means cooperating with said pin to indicate a value which is a function of the two known values.

3. In a computing device, a pair of slidable members arranged to be positioned in accordance with two known values, a pair of pivots rigidly associated with said slidable members, a pin movable along a characteristic path, a slotted member rotatably secured to said pin and in sliding engagement with said pivots, and a recording pen associated with said pin.

4. In a computing device, a pair of slidable members arranged to be positioned in accordance with two known values, a pair of pivots which are positioned in accordance with the position of said slidable members, a pin movable along characteristic path, a slotted member rotatably secured to said pin and in sliding engagement with said pivots, a curve sheet, a recording pen associated with said pin and in juxtaposition to said curve sheet, and means for normally holding said pen out of contact with said curve sheet.

5. In a device for computing values which are a function of a plurality of values that have been plotted to scale, indices arranged to be positioned in accordance with the plotted values, and means controlled by the position of said indices to indicate the desired value which is a function of the values previously plotted.

6. In a device for computing values which are a function of a plurality of values that have been plotted to scale, indices arranged to be positioned in accordance with the plotted values, and means controlled by the position of said indices to plot to scale the desired value which is a function of the values previously plotted.

7. In a device for computing values which are a function of a plurality of values that have previously been plotted as curves on a curve sheet, indices arranged to position in accordance with the plotted values, means for bringing various portions of said curve sheet in juxtaposition to said indices, and means controlled by the position of said indices to indicate the desired value which is a function of the values previously plotted.

8. In a device for computing values which are a function of a plurality of values that have previously been plotted as curves on a curve sheet, indices arranged to be positioned in accordance with the plotted values, means for bringing various portions of said curve sheet in juxtaposition to said indices and means controlled by the position of said indices to plot directly the desired value which is a function of the values previously plotted.

9. In a device for computing values which are a function of a plurality of values that have been plotted as curves on a curve sheet, indices arranged to be positioned in accordance with the plotted values, means for bringing various portions of said curve sheet in juxtaposition to said indices, and means controlled by the position of said indices for plotting directly on said curve sheet the value which is a function of the values previously plotted.

10. In a device for computing values which are a function of a plurality of known values, indices arranged to be positioned in accordance with said known values, means controlled by said indices for taking up a position which is a non-linear function of the desired value, and means for translating said non-linear function into a linear function of said desired value.

11. In a device for computing values which are a function of a plurality of values that have been previously plotted on a curve sheet, indices arranged to be positioned in accordance with the plotted values, means controlled by said indices for taking up a position which is a non-linear function of the desired value, and means for translating said non-linear function into a linear function of the desired value and plotting said desired value directly upon a curve sheet.

In witness whereof, I hereunto subscribe my name this 21st day of December, A. D., 1922.

EARL L. NEWELL.